(12) United States Patent
Liu et al.

(10) Patent No.: US 12,276,466 B2
(45) Date of Patent: Apr. 15, 2025

(54) HEAT EXCHANGER BASED ON GYROID/DIAMOND HYBRID MINIMAL SURFACE-BASED DISTURBANCE STRUCTURE

(71) Applicant: DALIAN UNIVERSITY OF TECHNOLOGY, Liaoning (CN)

(72) Inventors: Yu Liu, Liaoning (CN); Guanghan Yan, Liaoning (CN); Jiafel Zhao, Liaoning (CN); Yongchen Song, Liaoning (CN); Mingrui Sun, Liaoning (CN); Yiqiang Liang, Liaoning (CN); Lei Yang, Liaoning (CN); Lunxiang Zhang, Liaoning (CN); Yunsheng Yang, Liaoning (CN); Shuai Li, Liaoning (CN); Zhaoda Zhang, Liaoning (CN); Xiaokai Zhang, Liaoning (CN); Han Yan, Liaoning (CN); Fuyu Hua, Liaoning (CN); Yunlong Chai, Liaoning (CN); Jun Zhang, Liaoning (CN); Di Wu, Liaoning (CN); Kangjie Liu, Liaoning (CN); Peng Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 18/700,712

(22) PCT Filed: Dec. 26, 2022

(86) PCT No.: PCT/CN2022/141810
§ 371 (c)(1),
(2) Date: Apr. 12, 2024

(87) PCT Pub. No.: WO2023/173880
PCT Pub. Date: Sep. 21, 2023

(65) Prior Publication Data
US 2025/0067526 A1  Feb. 27, 2025

(30) Foreign Application Priority Data

Mar. 15, 2022 (CN) .......................... 202210255248.7

(51) Int. Cl.
| F28F 7/02 | (2006.01) |
| F28F 13/12 | (2006.01) |
| B33Y 80/00 | (2015.01) |

(52) U.S. Cl.
CPC ................ *F28F 7/02* (2013.01); *F28F 13/12* (2013.01); *B33Y 80/00* (2014.12); *F28F 2210/02* (2013.01); *F28F 2275/06* (2013.01)

(58) Field of Classification Search
CPC ......... B33Y 80/00; F28F 7/02; F28F 2210/02; F28F 13/12; F28F 13/0003
See application file for complete search history.

(56) References Cited

U.S. PATENT DOCUMENTS

2009/0321045 A1* 12/2009 Hernon .................. B22D 25/02
165/80.2
2014/0014493 A1* 1/2014 Ryan .................... B01D 53/185
203/49

(Continued)

FOREIGN PATENT DOCUMENTS

| CN | 111159903 | 5/2020 |
| CN | 111737835 | 10/2020 |

(Continued)

OTHER PUBLICATIONS

"International Search Report (Form PCT/ISA/210) of PCT/CN2022/141810," mailed on Mar. 11, 2023, with English translation thereof, pp. 1-4.

(Continued)

*Primary Examiner* — Eric S Ruppert
(74) *Attorney, Agent, or Firm* — JCIPRNET

(57) ABSTRACT

The present disclosure belongs to the technical field of heat exchangers, and provides a heat exchanger based on a (Continued)

Gyroid/Diamond (GD-type) hybrid minimal surface-based disturbance structure. The heat exchanger includes a core, headers, and flanges. The core includes a cold fluid channel and a hot fluid channel, the cold fluid channel and the hot fluid channel are separated by a parting sheet. An inlet and an outlet of the cold fluid channel are separated from an inlet and an outlet of the hot fluid channel by sealing bars. A GD-type hybrid minimal surface-based disturbance structure is inserted into the hot fluid channel. A cold fluid and a hot fluid are distributed in a cross-flow manner.

11 Claims, 4 Drawing Sheets

(56) References Cited

U.S. PATENT DOCUMENTS

| | | | |
|---|---|---|---|
| 2018/0187984 A1* | 7/2018 | Manzo | F28F 13/12 |
| 2020/0033070 A1* | 1/2020 | Vlahinos | B01F 25/43231 |
| 2022/0003503 A1* | 1/2022 | Iyer | B01D 69/10 |

FOREIGN PATENT DOCUMENTS

| | | |
|---|---|---|
| CN | 112483569 | 3/2021 |
| CN | 112989672 | 6/2021 |
| CN | 114623705 | 6/2022 |
| WO | 2021248377 | 12/2021 |

OTHER PUBLICATIONS

"Written Opinion of the International Searching Authority (Form PCT/ISA/237) of PCT/CN2022/141810," mailed on Mar. 11, 2023, with English translation thereof, pp. 1-8.

\* cited by examiner

HEAT EXCHANGER BASED ON GYROID/DIAMOND HYBRID MINIMAL SURFACE-BASED DISTURBANCE STRUCTURE

CROSS-REFERENCE TO RELATED APPLICATION

This application is a 371 of international application of PCT application serial no. PCT/CN2022/141810, filed on Dec. 26, 2022, which claims the priority benefit of China application no. 202210255248.7, filed on Mar. 15, 2022. The entirety of each of the above-mentioned patent applications is hereby incorporated by reference herein and made a part of this specification.

TECHNICAL FIELD

The present disclosure belongs to the technical field of heat exchangers, and specifically relates to a heat exchanger based on an optimized bionic minimal surface-based disturbance structure.

BACKGROUND

As an important means for heat exchange, heat exchangers are widely used in fields such as chemical engineering, aviation, and food. The application of heat exchangers in the aviation field has become a research hotspot in recent years. As aviation aircraft are developing towards high Mach numbers, the gradually increasing flight velocity poses higher requirements on thermal management, and a large amount of waste heat needs to be removed or recycled. At present, for most heat exchangers in the aviation field, fuel is used as a heat sink to cool the hot-end working fluid. At the same time, it can increase the fuel temperature, thereby improving the combustion efficiency. Heat exchangers required in the aviation field need to be lightweight, efficient, and safe. Therefore, it is of great significance to design a compact heat exchanger suitable for aviation aircraft to further improve the performance of aviation aircraft. At present, disturbance structures of heat exchangers used in aviation aircraft are mostly rectangular fins, serrated fins, herringbone wavy fins, and so on. Such disturbance structures are simple to fabricate and are highly compatible with conventional heat exchangers. However, such disturbance structures have a low heat exchange capacity due to insufficient disturbance. To solve this problem, it is necessary to design a more complex structure to increase the heat exchange capacity.

In plate-fin heat exchangers, hot fluid and cold fluid are separated by parting sheets, and the hot fluid and the cold fluid are alternately arranged. Fins are inserted into each flow channel to increase the disturbance effect and enhance the mechanical strength. Plate-fin heat exchangers have advantages such as compact structure, small size, low material consumption, high heat transfer coefficient, and excellent adaptability, and can meet the heat exchange requirements of aviation aircraft in many aspects. Minimal surfaces are bionic structures and have been found in many biological structures such as human skeleton, sea urchin skeleton, and butterfly wings. Studies have shown that these structures have good mechanical properties and thermal properties. Among others, a Gyroid (G-type) minimal surface has superior thermal properties. A Gyroid/Diamond (GD-type) hybrid minimal surface is designed based on the G-type minimal surface. The GD-type hybrid minimal surface is arranged as a disturbance structure in the flow channel. When the fluid flows through the disturbance structure, the disturbance is increased, the heat transfer area is increased, and more vortexes are generated, thereby enhancing the convective heat transfer effect. However, conventional GD-type hybrid minimal surfaces are mostly used to optimize the structural strength, and there is no inspiration in the prior art to specifically design a GD-type hybrid minimal surface for improving the heat transfer effect.

SUMMARY

Technology Problem

In order to increase the fuel temperature at the fuel inlet and recycle waste heat in aviation aircraft, the present disclosure uses a heat exchanger to exchange heat between a working medium with waste heat and fuel. Accordingly, the present disclosure provides a heat exchanger based on a GD-type hybrid minimal surface-based disturbance structure. To solve the above problems, the following technical solutions are employed in the present disclosure.

Solution to the Problem

Technical Solution

A heat exchanger based on a GD-type hybrid minimal surface-based disturbance structure is provided, including a core, headers, and flanges. The core includes a cold fluid channel and a hot fluid channel. The hot fluid channel is filled with the GD-type hybrid minimal surface-based disturbance structure, and the GD-type hybrid minimal surface is controlled by the following basic equation:
$0.5*(\sin(x)*\cos(y)+\sin(y)*\cos(z)+\sin(z)*\cos(x)+\sin(x)*\sin(y)*\sin(z)+\sin(x)*\cos(y)*\cos(z)+\cos(x)*\sin(y)*\cos(z)+\cos(x)*\cos(y)*\sin(z))$. The GD-type hybrid minimal surface is different from a conventional G-type minimal surface in that the GD-type hybrid minimal surface is added with characteristic elements of a Diamond (D-type) minimal surface.

Further, the heat exchanger is made of an aluminum alloy, the GD-type hybrid minimal surface-based disturbance structure is manufactured by three-dimensional printing (3D printing), and respective components of the heat exchanger are connected by welding.

Further, a length and a width of the GD-type hybrid minimal surface-based disturbance structure in the hot fluid channel are equal. The length and the width respectively refer to a dimension along a flow direction of a fluid and a dimension along a spanwise direction of the fluid.

Further, the cold fluid channel and the hot fluid channel are separated by a parting sheet, an inlet and an outlet of the cold fluid channel are separated from an inlet and an outlet of the hot fluid channel by sealing bars, and a pin rib disturbance structure is inserted into the cold fluid channel; the headers include hot fluid headers and cold fluid headers; the flanges include four flanges including two flanges respectively at the inlet and the outlet of the hot fluid channel and two flanges respectively at the inlet and the outlet of the cold fluid channel, and sides without the flanges and the headers are sealed by baffles; and a cold fluid and a hot fluid are arranged in a cross-flow configuration.

Further, the GD-type hybrid minimal surface-based disturbance structure is closely attached to the parting sheet.

The present disclosure also provides a heat exchanger based on a GD-type hybrid minimal surface-based disturbance structure, including a core, headers, and flanges. The core includes a cold fluid channel and a hot fluid channel. The hot fluid channel is filled with the GD-type hybrid minimal surface-based disturbance structure, and the GD-type hybrid minimal surface-based disturbance structure is controlled by the following basic equation:

$$N*(\sin(A*\pi*x)*\cos(B*\pi*y) +$$
$$\sin(B*\pi*y)*\cos(C*\pi*z) + \sin(C*\pi*z)*\cos(A*\pi*x)) +$$
$$(1-N)*(\sin(A*\pi*x)*\sin(B*\pi*y)*\sin(C*\pi*z) +$$
$$\sin(A*\pi*x)*\cos(B*\pi*y)*\cos(C*\pi*z) + \cos(A*\pi*x)*\sin(B*\pi*y)*$$
$$\cos(C*\pi*z) + \cos(A*\pi*x)*\cos(B*\pi*y)*\sin(C*\pi*z)) = M,$$

where M, N, A, B, and C are constants; M is used for controlling a porosity of the GD-type hybrid minimal surface-based disturbance structure, where when M=0, the GD-type hybrid minimal surface-based disturbance structure does not have a thickness; N represents a proportion of a G-type original minimal surface element in a structural unit; and A, B, and C are constants in trigonometric functions and are respectively used for controlling numbers of lattices per unit length in x, y, and z directions.

Preferably, in the basic equation for controlling the GD-type hybrid minimal surface-based disturbance structure, N=0.5, M=0.1382, and A=B=C=2.

Beneficial Effects of Invention

Beneficial Effects

The present disclosure has the following advantages. The heat exchanger based on the GD-type hybrid minimal surface-based disturbance structure according to the present disclosure has the advantages of compact structure, light weight, large heat transfer area, high heat transfer efficiency, and the like. Particularly, compared with conventional G-type minimal surfaces, the independently designed GD-type hybrid minimal surface-based disturbance structure of the present disclosure greatly increases the heat transfer area, increases the number of vortexes, realizes reasonable porosity distribution, and greatly improves the heat transfer efficiency. The heat exchanger according to the present disclosure is compact, lightweight and efficient, providing a new idea for heat exchange in aviation aircraft.

BRIEF DESCRIPTION OF THE DRAWINGS

Description of the Drawings

Figure 1:
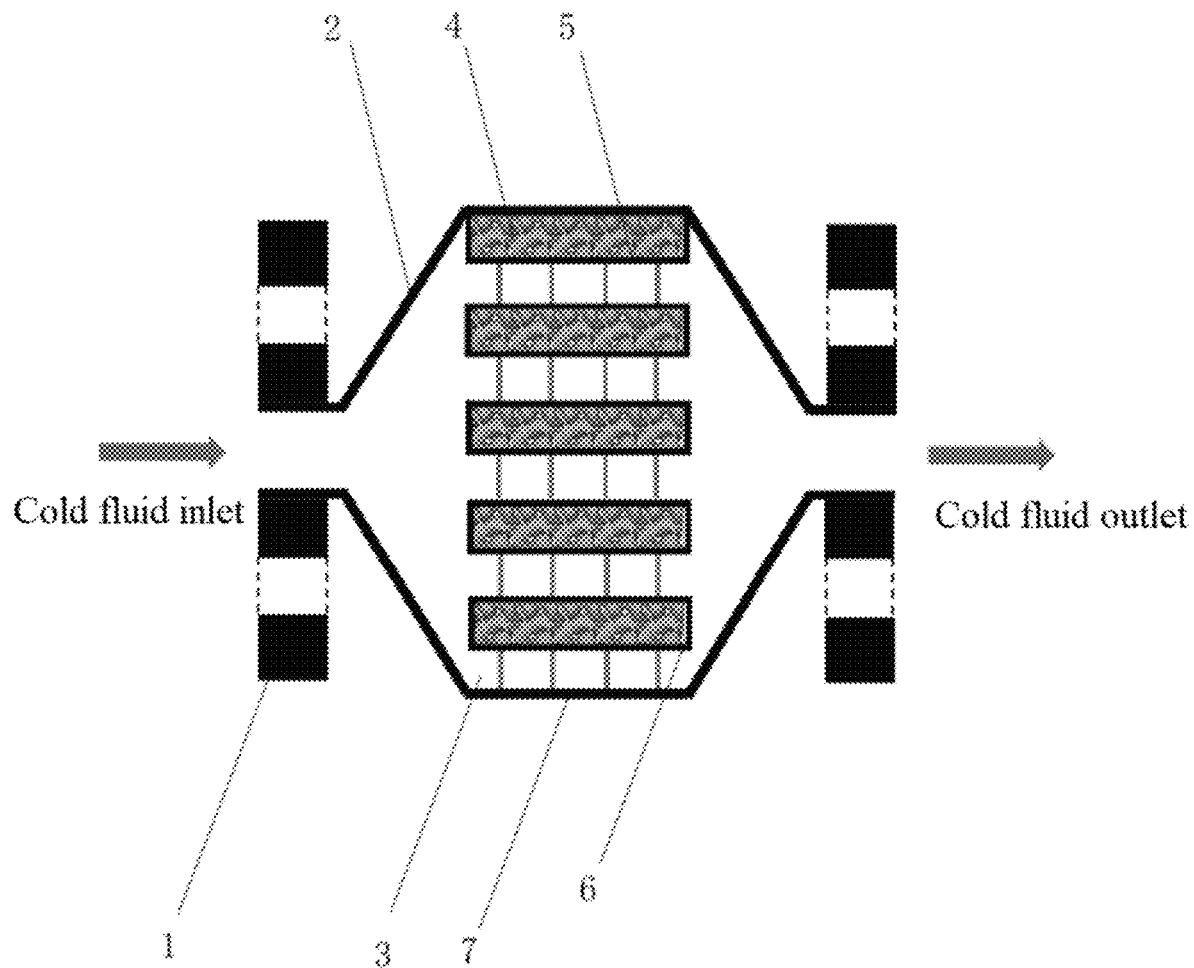

FIG. 1 is a front view (structural cross-sectional view) of a heat exchanger based on a GD-type hybrid minimal surface-based disturbance structure according to the present disclosure.

Figure 2:
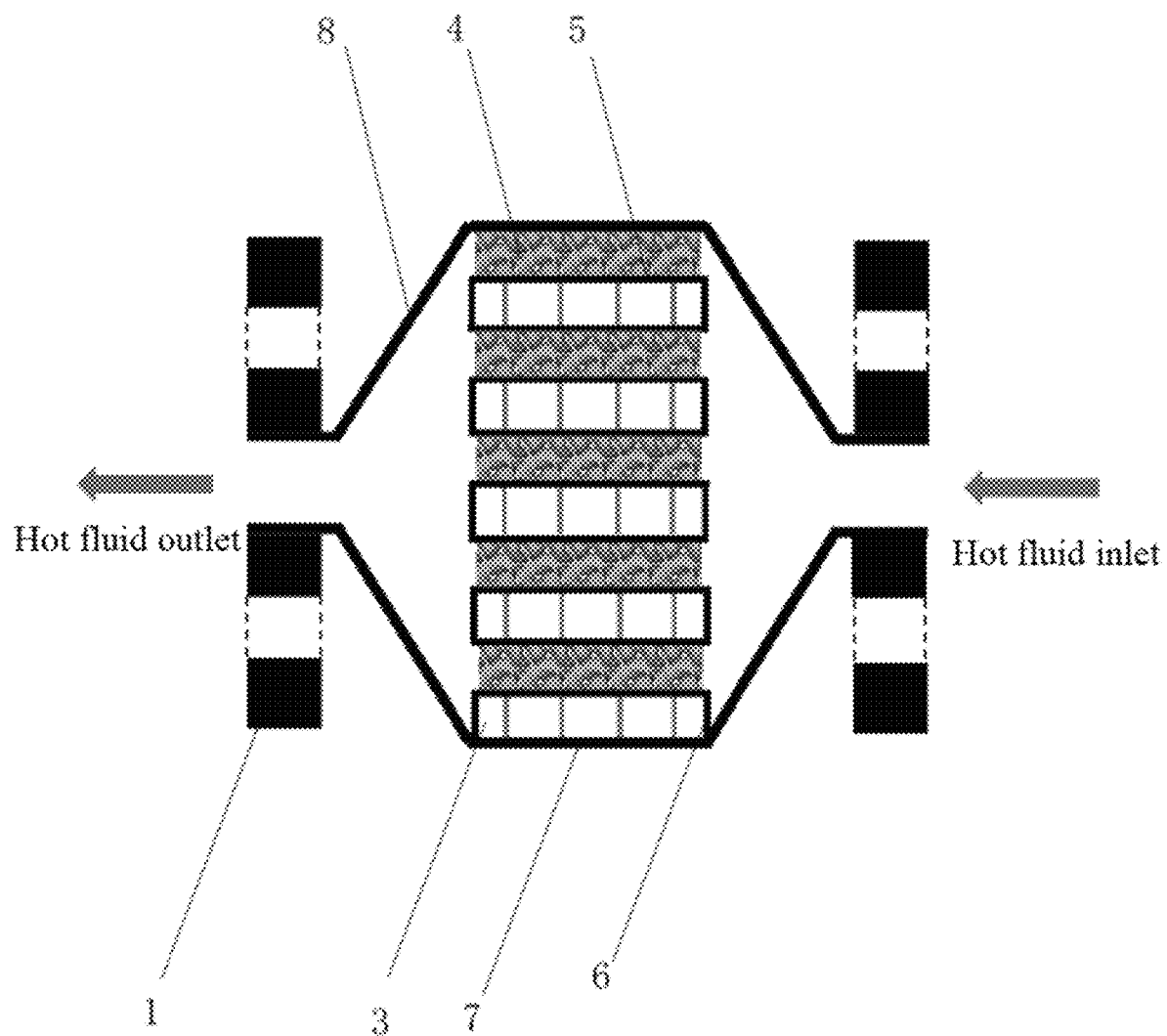

FIG. 2 is a left view (structural cross-sectional view) of a heat exchanger based on a GD-type hybrid minimal surface-based disturbance structure according to the present disclosure.

Figure 3:
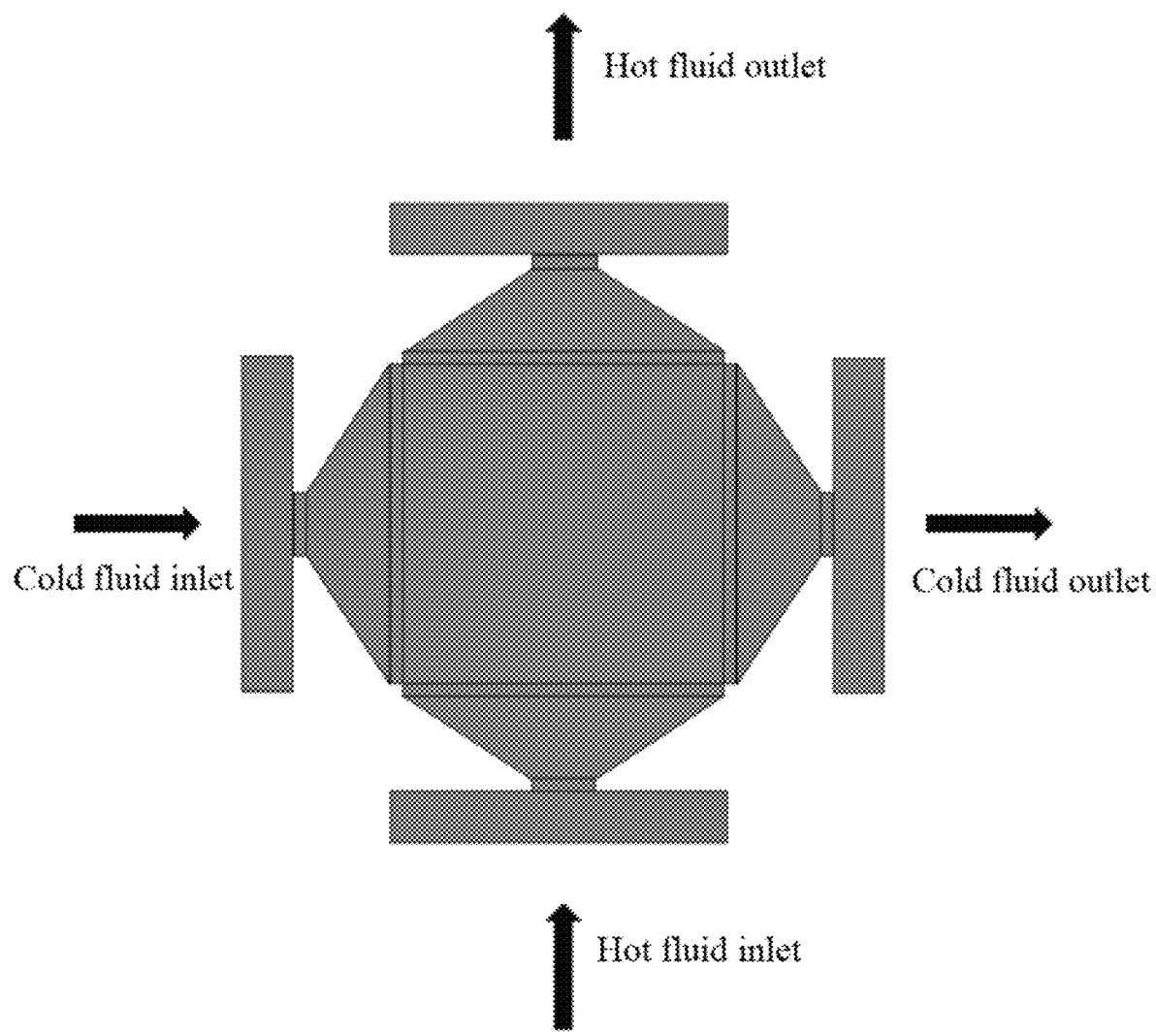

FIG. 3 is a top view of a heat exchanger based on a GD-type hybrid minimal surface-based disturbance structure according to the present disclosure.

Figure 4:
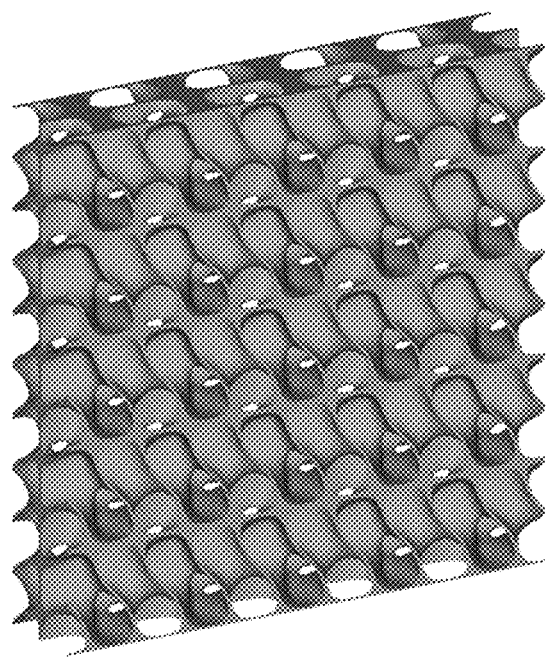

FIG. 4 is a three-dimensional structural view of a GD-type hybrid minimal surface-based disturbance structure according to the present disclosure.

In the drawings: 1. flange; 2. cold fluid header; 3. cold fluid channel; 4. hot fluid channel; 5. parting sheet; 6. sealing bar; 7. baffle; 8. hot fluid header.

EMBODIMENT OF INVENTION

Detailed Description of the Embodiments

A detailed description will be given below with reference to structural views of the present disclosure.

Example 1

As shown in FIG. 1 and FIG. 2, the present disclosure provides a heat exchanger based on a GD-type hybrid minimal surface-based disturbance structure, which includes a core, headers, and flanges 1. The core includes cold fluid channels 3, hot fluid channels 4, parting sheets 5, sealing bars 6, and baffles 7. The headers include two cold fluid headers 2 and two hot fluid headers 8. The flanges 1 include four flanges 1. Pin rib disturbance structures are used as a disturbance and support structure in the cold fluid channel 3. The GD-type hybrid minimal surface-based disturbance structure is used as a disturbance and support structure in the hot fluid channel 8. The flanges 1 are respectively connected to the cold fluid headers 2 and the hot fluid headers 8 by welding. The cold fluid headers 2 are connected to the core by welding. The hot fluid headers 8 are connected to the core by welding. The pin rib disturbance structures in the cold fluid channel 3 are connected to the parting sheet 5 and the baffle 7 by welding. The GD-type hybrid minimal surface-based disturbance structure in the hot fluid channel 4 is connected to the parting sheet 5 and the baffle 7 by welding. The parting sheet 5 is connected to the sealing bar 6 by welding.

The cold fluid is fuel of aviation aircraft, the hot fluid is high-temperature air, and flow directions of the cold fluid and the hot fluid are perpendicular to each other. The heat exchanger is made of an aluminum alloy, the GD-type hybrid minimal surface-based disturbance structure is manufactured of an aluminum alloy (AlSi10Mg) by 3D printing (selective laser melting).

The GD-type hybrid minimal surface-based disturbance structure has a height of 10 mm, a length of 50 mm, and a width of 50 mm.

The pin rib disturbance structures in the cold fluid channel 3 each have a diameter of 1 mm and a height of 10 mm. 16 pin rib disturbance structures are arranged in a rectangular pattern, where the number of pin rib disturbance structures in each row is equal to that in each column.

The number of cold fluid channels and the number of hot fluid channels are equal, and are both 5. The cold fluid channels and the hot fluid channels are alternately arranged, and the cold fluid and the hot fluid are distributed in the cross-flow manner.

In the heat exchange process, a cold fluid working medium pipeline is connected to one of the cold fluid headers 2 through a first flange, and the cold fluid enters the cold fluid channels 3 in the core through the space inside the one of the cold fluid headers 2. Because the hot fluid channels 4 are provided with the sealing bars 6 at the cold fluid inlet, the cold fluid working medium does not enter the hot fluid channels. A hot fluid working medium pipeline is connected to one of the hot fluid headers 8 through a second flange, and the hot fluid enters the hot fluid channels 4 in the core through the space inside the one of the hot fluid headers 8. Because the cold fluid channels 3 are provided with the sealing bars 6 at the hot fluid inlet, the hot fluid working medium does not enter the cold fluid channels. After the cold fluid and hot fluid enter their respective channels, the cold fluid channel 3 generates more vortexes under the influence of the pin rib disturbance structures, and heat exchange occurs with the hot fluid through the parting sheet 5. The hot fluid in the hot fluid channels 4 has an increased heat transfer area, increased fluid disturbance, and an increased turbulence degree under the action of the GD-type hybrid minimal surface-based disturbance structure, and exchanges heat with the cold fluid through the parting sheets 5. As shown in FIG. 3, flow directions of the cold fluid and the hot fluid are perpendicular to each other, so that the heat transfer efficiency can be effectively improved. After the heat exchange is completed, the cold fluid flows out of the heat exchanger through the space inside the other of the cold fluid headers 2, and the hot fluid flows out of the heat exchanger through the space inside the other of the hot fluid headers 8.

Comparative Example 1

On the basis of Example 1, the GD-type hybrid minimal surface-based disturbance structure in Example 1 as described above is replaced with a conventional G-type minimal surface-based disturbance structure, and it is ensured that the porosities of the two structures are both 80%. Single-layer disturbance structures are tested in a flow heat transfer test bench, and the heat transfer results of the two structures are compared and analyzed.

In Example 1, when the porosity of the structure is 80%, the GD-type hybrid minimal surface-based disturbance structure is controlled by the following basic equation:

$$5 * (\sin(2\pi * x) * \cos(2\pi * y) + \sin(2\pi * y) * \cos(2\pi * z) + \sin(2\pi * z) * \cos(2\pi * x)) + 0.5(\sin(2\pi * x) * \sin(2\pi * y) * \sin(2\pi * z) + \sin(2\pi * x) * \cos(2\pi * y) * \cos(2\pi * z) + \cos(2\pi * x) * \sin(2\pi * y) * \cos(2\pi * z) + \cos(2\pi * x) * \cos(2\pi * y) * \sin(2\pi * z)) = 0.1382.$$

According to the comparison results, the single-layer structures are tested in flow channels. The experimental results show that the Nusselt numbers (Nu) of the GD-type hybrid minimal surface are 35.13%, 43.24%, and 45.58% higher than those of the conventional G-type minimal surface respectively at the incoming flow velocities of 4 m/s, 6 m/s, and 8 m/s when a bottom heating power of 100 W is used. The Nusselt numbers (Nu) of the GD-type hybrid minimal surface are 36.6%, 45.71%, and 46.71% higher than those of the conventional G-type minimal surface respectively at the incoming flow velocities of 4 m/s, 6 m/s, and 8 m/s when a bottom heating power of 50 W is used.

When applied to an aviation aircraft, the cold fluid is generally fuel, and the hot fluid is generally a working medium with waste heat during the flight of the aviation aircraft. The introduction of the GD-type hybrid minimal surface-based disturbance structure greatly increases the heat transfer area and improves the heat transfer efficiency, providing a new idea for waste heat recovery and fuel preheating in aviation aircraft.

What is claimed is:

1. A heat exchanger based on a Gyroid/Diamond (GD-type) hybrid minimal surface-based disturbance structure, comprising a core, headers, and flanges, wherein the core comprises a cold fluid channel and a hot fluid channel, the hot fluid channel is filled with the GD-type hybrid minimal surface-based disturbance structure, and the GD-type hybrid minimal surface is controlled by the following basic equation:

$$0.5 * (\sin(x) * \cos(y) + \sin(y) * \cos(z) + \sin(z) * \cos(x) + \sin(x) + \sin(y) * \sin(z) + \sin(x) * \cos(y) * \cos(z) + \cos(x) * \sin(y) * \cos(z) + \cos(x) * \cos(y) * \sin(z)).$$

2. The heat exchanger based on the GD-type hybrid minimal surface-based disturbance structure according to claim 1, wherein the heat exchanger is made of an aluminum alloy, the GD-type hybrid minimal surface-based disturbance structure is manufactured by three-dimensional printing, and respective components of the heat exchanger are connected by welding.

3. The heat exchanger based on the GD-type hybrid minimal surface-based disturbance structure according to claim 1, wherein a length and a width of the GD-type hybrid minimal surface-based disturbance structure in the hot fluid channel are equal.

4. The heat exchanger based on the GD-type hybrid minimal surface-based disturbance structure according to claim 1, wherein the GD-type hybrid minimal surface-based disturbance structure has a height of 10 mm, a length of 50 mm, and a width of 50 mm.

5. The heat exchanger based on the GD-type hybrid minimal surface-based disturbance structure according to claim 1, wherein the cold fluid channel and the hot fluid channel are separated by a parting sheet, an inlet and an outlet of the cold fluid channel are separated from an inlet and an outlet of the hot fluid channel by sealing bars, and a pin rib disturbance structure is inserted into the cold fluid channel; the headers comprise hot fluid headers and cold fluid headers; the flanges comprise four flanges comprising two flanges respectively at the inlet and the outlet of the hot fluid channel and two flanges respectively at the inlet and the outlet of the cold fluid channel, and sides without the flanges and the headers are sealed by baffles; and a cold fluid and a hot fluid are distributed in a cross-flow manner.

6. The heat exchanger based on the GD-type hybrid minimal surface-based disturbance structure according to claim 5, wherein the GD-type hybrid minimal surface-based disturbance structure is closely attached to the parting sheet.

7. The heat exchanger based on the GD-type hybrid minimal surface-based disturbance structure according to claim 5, wherein 16 pin rib disturbance structures are provided in the cold fluid channel, each of the pin rib disturbance structures has a diameter of 1 mm and a height of 10 mm, and the pin rib disturbance structures are arranged in a rectangular pattern, and a number of the pin rib disturbance structures in each row is equal to a number of the pin rib disturbance structures in each column.

8. The heat exchanger based on the GD-type hybrid minimal surface-based disturbance structure according to claim 5, wherein 5 cold fluid channels and 5 hot fluid channels are provided, and the cold fluid channels and the hot fluid channels are alternately arranged, and the cold fluid and the hot fluid are distributed in the cross-flow manner.

9. The heat exchanger based on the GD-type hybrid minimal surface-based disturbance structure according to claim 5, wherein a cold fluid working medium pipeline is connected to one of the cold fluid headers through a first flange, and the cold fluid enters the cold fluid channel in the core through a space inside the one of the cold fluid headers; a hot fluid working medium pipeline is connected to one of the hot fluid headers through a second flange, and the hot fluid enters the hot fluid channel in the core through a space inside the one of the hot fluid headers; after the cold fluid and the hot fluid respectively enter the cold fluid channel and the hot fluid channel, the cold fluid in the cold fluid channel exchanges a heat with the hot fluid through the parting sheet under an action of the pin rib disturbance structure; the hot fluid in the hot fluid channel exchanges the heat with the cold fluid through the parting sheet under an action of the GD-type hybrid minimal surface-based disturbance structure; and after the heat is exchanged between the cold fluid and the hot fluid, the cold fluid flows out of the heat exchanger through a space inside the other of the cold fluid headers, and the hot fluid flows out of the heat exchanger through a space inside the other of the hot fluid headers.

10. A heat exchanger based on a GD-type hybrid minimal surface-based disturbance structure, comprising a core, headers, and flanges, wherein the core comprises a cold fluid channel and a hot fluid channel, the hot fluid channel is filled with the GD-type hybrid minimal surface-based disturbance structure, and the GD-type hybrid minimal surface-based disturbance structure is controlled by the following basic equation:

$$N*(\sin(A*\pi*x)*\cos(B*\pi*y) + \sin(B*\pi*y)*\cos(C*\pi*z) + \sin(C*\pi*z)*\cos(A*\pi*x)) + (1-N)*(\sin(A*\pi*x)*\sin(B*\pi*y)*\sin(C*\pi*z) + \sin(A*\pi*x)*\cos(B*\pi*y)*\cos(C*\pi*z) + \cos(A*\pi*x)*\sin(B*\pi*y)*\cos(C*\pi*z) + \cos(A*\pi*x)*\cos(B*\pi*y)*\sin(C*\pi*z)) = M,$$

wherein M, N, A, B, and C are constants; M is used for controlling a porosity of the GD-type hybrid minimal surface-based disturbance structure, wherein when M=0, the GD-type hybrid minimal surface-based disturbance structure does not have a thickness; N represents a proportion of a Gyroid (G-type) original minimal surface element in a structural unit; and A, B, and C are constants in trigonometric functions and are respectively used for controlling numbers of lattices per unit length in x, y, and z directions.

11. The heat exchanger based on the GD-type hybrid minimal surface-based disturbance structure according to claim 10, wherein in the basic equation for controlling the GD-type hybrid minimal surface-based disturbance structure, N=0.5, M=0.1382, and A=B=C=2.

* * * * *